United States Patent
Laporte (10) Patent No.: US 9,808,898 B2
(45) Date of Patent: Nov. 7, 2017

(54) SEALING SYSTEM FOR A TOOL HOLDER

(71) Applicant: MITIS, Bouguenais (FR)

(72) Inventor: Sylvain Laporte, Nantes (FR)

(73) Assignee: MITIS, Bouguenais (FR)

( * ) Notice: Subject to any disclaimer, the term of this patent is extended or adjusted under 35 U.S.C. 154(b) by 143 days.

(21) Appl. No.: 14/442,497

(22) PCT Filed: Nov. 13, 2013

(86) PCT No.: PCT/IB2013/060101
§ 371 (c)(1),
(2) Date: May 13, 2015

(87) PCT Pub. No.: WO2014/076641
PCT Pub. Date: May 22, 2014

(65) Prior Publication Data
US 2016/0039064 A1    Feb. 11, 2016

(30) Foreign Application Priority Data

Nov. 13, 2012 (FR) .................................... 12 60796

(51) Int. Cl.
*B23Q 11/10* (2006.01)
*B23B 31/02* (2006.01)
*B23B 31/20* (2006.01)

(52) U.S. Cl.
CPC .......... *B23Q 11/1023* (2013.01); *B23B 31/02* (2013.01); *B23B 31/20* (2013.01);
(Continued)

(58) Field of Classification Search
CPC .............. B23Q 11/103; B23Q 11/1023; B23B 2250/12; B23B 2231/24;
(Continued)

(56) References Cited

U.S. PATENT DOCUMENTS 904,692 A * 11/1908 Greve et al. ............ E21B 21/01
173/80
3,229,427 A * 1/1966 Goodhew ............... B23B 51/06
408/57
(Continued)

FOREIGN PATENT DOCUMENTS

EP    0629462 A2   12/1994
EP    1541279 A1    6/2005
(Continued)

OTHER PUBLICATIONS

Feb. 26, 2014 International Search Report issued in Application No. PCT/IB2013/060101.
Feb. 26, 2014 Written Opinion issued in Application No. PCT/IB2013/060101.

*Primary Examiner* — Daniel Howell
(74) *Attorney, Agent, or Firm* — Oliff PLC (57) ABSTRACT

The present invention concerns a sealing system for a tool holder of a fluid-assisted axial machining or milling machine, including:—at least first and second seals contributing to define a space for the flow of fluid to at least one inner channel of the tool, one of the seals being applied to the tool or an optional adapter carrying the tool and the other seal a) being applied to the tool or to the adapter carrying the tool or b) being applied to a surface spaced apart from the tool and rotating with same, with $0.3 \leq Do/Dj_{max}$ for Do in the interval [1; 3] in mm and $0.5 \leq Do/Djmax$ for Do in the interval [3; 20] in mm, where Do is the diameter of the tool facing this other seal and Djmax is the internal diameter of this seal.

13 Claims, 7 Drawing Sheets

(52) U.S. Cl.
CPC ........ *B23Q 11/103* (2013.01); *B23B 2231/24* (2013.01); *B23B 2250/12* (2013.01); *Y10T 279/17111* (2015.01); *Y10T 408/45* (2015.01); *Y10T 409/304032* (2015.01)

(58) Field of Classification Search
CPC . Y10T 409/303976; Y10T 409/304032; Y10T 408/45; Y10T 408/455; Y10T 279/17111
See application file for complete search history.

(56) References Cited

U.S. PATENT DOCUMENTS

| | | | | |
|---|---|---|---|---|
| 3,791,660 | A | * | 2/1974 | Bostley .................. B23B 51/06 279/20 |
| 4,570,952 | A | * | 2/1986 | Heimbigner ......... B23Q 1/0036 279/20 |
| 4,693,646 | A | * | 9/1987 | Andrews ................ B23B 51/06 408/59 |
| 7,147,410 | B2 | | 12/2006 | Jansen |
| 2011/0222976 | A1 | * | 9/2011 | Uchiuzo ................ B23B 31/20 408/59 |

FOREIGN PATENT DOCUMENTS

| | | | | | |
|---|---|---|---|---|---|
| FR | | 1568265 | A | * 5/1969 | ........... B23B 51/042 |
| FR | | 2295810 | A1 | * 7/1976 | ............. B23B 51/02 |
| GB | | 1366638 | A | 9/1974 | |
| JP | | 09155614 | A | * 6/1997 | |

\* cited by examiner

SEALING SYSTEM FOR A TOOL HOLDER

The present invention relates to fluid-assisted machining.

In machining methods that involve rotary tools, such as axial machining or milling methods, notably drilling or countersinking, it is often beneficial to be able to convey a fluid, such as a lubricant, notably a straight oil, a soluble oil, an oil/water mixture or a gas, to the tip of the tool.

Certain machine tools are fitted with rotary seals incorporated into the arbor, so that this function can be fulfilled.

In instances where this is not the case, a sealing system at tool-holder level may be employed. This system then needs to perform both, on the one hand, the function of conveying the fluid to a manifold communicating with one or more internal passages of the tool that are able to convey it as far as the end thereof, to the region of the cutting zone in particular, and, on the other hand, the function of guiding and of transmitting the torque needed for rotating the tool.

Seals are used and come into contact with the manifold in order to seal the circulation of fluid from a fluid inlet.

The sizing of the tool holder to allow it to transmit the torque dictates the use of a manifold of relatively large diameter and the seals providing sealing come into contact with a rubbing surface, defined by the manifold, which is of a relatively large diameter.

The peripheral rubbing speed of the seals is therefore high and the direct consequence of this is a limit on the maximum rotational frequency of the tool, thereby preventing certain operating domains. This limit usually lies at around about 5000 revolutions per minute and becomes all the more problematical when the drilling is a small-diameter drilling, because rotational frequency is inversely proportional to the diameter of the tool.

U.S. Pat. No. 7,147,410 discloses a tool holder in which the tool is engaged in a clamping ring against which two seals press in order to define a space in which a fluid coolant flows as far as the tool.

There is a need to improve still further the machining methods and tool holders of machine tools that use a cutting fluid in order notably to allow the tool to be rotated at a high rotational frequency.

The invention answers this need using a sealing system for a tool holder of a cutting fluid-assisted machine tool, comprising:

at least a first and a second seal contributing to delimiting a space for the circulation of the fluid toward at least one internal passage of the tool, one of the seals pressing against the tool or a tool-bearing adapter there may be, and the other seal a) pressing against the tool or against the tool-bearing adapter or b) pressing against a surface spaced away from the tool and rotating with the latter, with $0.3 \leq Do/Dj_{max}$ for Do in the range [1; 3] in mm and $0.5 \leq Do/Dj_{max}$ for Do in the range [3; 20] in mm, where Do is the diameter of the tool facing this other seal and $Dj_{max}$ is the diameter of the rubbing surface of this seal, which is also the largest internal diameter of the two seals.

By virtue of the invention it is possible to equip cutting fluid-assisted machine tools, which are not provided with a rotary seal, with a tool holder of lesser bulk and which allows the ranges and domains of use to be extended by comparison with the known solutions. The additional length is for example limited, with respect to a conventional tool holder, to around 15 mm, it being possible for the bulk in the radial dimension not to be increased.

The invention can be applied equally to vibrational drilling methods and to conventional drilling methods and is quite particularly suitable for the fleets of machine tools that are not equipped with rotary seals and that work on a limited number of drilling diameters, entailing few, if any, changes of tool holder.

The sealing may be achieved by virtue of the invention on rubbing surfaces the diameter of which is close to that of the tool, or even on the tool itself, thereby making it possible to reduce the rubbing speed and allow a higher rotational frequency.

The two seals press against the tool or against the adapter according to the first variant a), which is preferred but may dictate the use of special-purpose tools. One of the seals presses against the tool and the other against a surface of the tool holder, according to the second variant b), which is easier to implement on the majority of the tools in existence in the marketplace.

The surface against which the second seal presses in variant b) is defined by a wall of the tool holder, which wall is preferably defined by an adapter ring, which may preferably come into contact with a tool clamping means, notably an expanding collet. The adapter ring may be at least partially engaged inside a collet nut. Said wall is in contact on one side with the rubbing surface of the seal, and on the opposite side extends away from the tool to allow the fluid to circulate between the tool of the tool holder as far as said internal passage in the tool. This wall is preferably as thin as possible and as close as possible to the tool. At a tool change, the adapter ring may be replaced by another, adapted to the new diameter of tool.

As an alternative, the surface against which the second seal presses in variant b) is defined by an adapter sleeve which fits around the tool and comes into contact with the expanding collet. The adapter sleeve is preferably deformable. As the collet is tightened, the adapter sleeve can deform, preferably elastically, and come into contact with the tool to grip it, transmitting the torque of the collet to it and holding it in place and centered. When the collet is loosened, the adapter sleeve preferably reverts to its previous shape and releases the tool.

For preference, the adapter sleeve has at least one longitudinal groove, or better, a plurality of longitudinal grooves extending over its internal surface and over its entire length. The longitudinal groove or grooves allow the cutting fluid to circulate toward the internal passage of the tool and make it easier for the sleeve to undergo elastic deformation under the constraint imposed by the collet.

The adapter sleeve may comprise at least 3 longitudinal grooves, notably depending on the diameter of the tool. The larger the external diameter of the tool, the higher may be the number of grooves and the more the cutting fluid may circulate.

At the tool change, the adapter sleeve may be replaced by another, adapted to the new diameter of tool.

The adapter sleeve may comprise an annular groove intended to accept a snap ring (circlip) arranged between the collet and a seal-bearing ring. The snap ring allows the adapter sleeve to be immobilized axially and makes it possible to limit the depth to which it penetrates the tool holder. The sealing of the internal end of the sleeve may be performed by a seal arranged between an end plug and the inside surface of the sleeve. The seal may be an O-ring seal housed in an annular groove of the sleeve.

The end plug may be fitted by sliding it into the adapter sleeve from the opposite end from the seal and it is held against the seal by the pressure of the cutting fluid in the adapter sleeve in order to seal the adapter sleeve closed.

The end plug may comprise an annular groove of substantially quadrant shape, notably having an angular extent about the center of the section of slightly more than 90°, preferably of between 90° and 120°, in order to accept the O-ring seal.

The fluid pressure in the adapter sleeve is preferably comprised between 1 bar and 10 bar, better between 1 bar and 7 bar.

The seals are advantageously borne by the seal-bearing ring of the sealing system, which ring is adapted to the diameter of the tool or of the adapter bearing the tool, arranged in contact with a stator acting as a coupling for a fluid inlet, in pivoting connection with the collet nut via a rolling bearing. At the tool change and when switching from a tool of a first diameter to a tool of another diameter, this seal-bearing ring may be replaced by a new ring adapted to the new diameter of the tool.

The sealing system may be offered with components which are the same for all diameters of tool, notably the collet nut and certain parts of the stator, and with others which are changed according to the diameter of the tool, notably the seal-bearing ring, the seals, the adapter ring or the adapter sleeve, or even the collet (if the user does not already have same).

All the components that are changed according to the diameter of the tool may thus define ranges of adapter rings or of adapter sleeves, of seal-bearing rings and of seals adapted to different diameters of tool, which are offered to the user together with the other components of the sealing system, which may themselves be invariable.

Another subject of the invention, in another aspect thereof, is a range of sealing systems or of components of a sealing system, which are adapted to respective tools of different diameters, including a tool or adapter of diameter D1 and a tool or adapter of diameter D2 greater than D1.

Another subject of the invention is therefore a range of at least a first and a second sealing system, or a set of at least a first sealing system and a range of components that allow this first sealing system to be modified to form a second sealing system by reusing components of the first sealing system, the two sealing systems being intended for one and the same tool holder of a cutting fluid-assisted machine tool, adapted to different diameters D1 and D2 of tool or adapter, where D2 is greater than D1, each sealing system comprising at least a first seal contributing to delimiting a space for the circulation of the fluid toward at least one internal passage of the tool, the seal being interposed between surfaces to which a relative rotational movement is imparted, as the tool rotates, the inside diameter of the first seal of the first sealing system being intended to collaborate with the tool or adapter of diameter D1, and the inside diameter of the first seal of the second sealing system being intended to collaborate with the tool or adapter of diameter D2.

Each sealing system also comprises a second seal likewise contributing to delimiting the space for the circulation of the fluid, the second seal of the first sealing system being intended to collaborate with the tool or adapter of diameter D1, the second seal of the first sealing system being of an inside diameter less than the inside diameter of the second seal of the second sealing system, intended to collaborate with the tool or adapter of diameter D2.

The user can therefore be offered, in the same package, two sealing systems adapted to different diameters of tool, or, better, a first sealing system and the components that allow this first sealing system to be modified by reusing some of its components and supplementing them with components specific to the other diameters of tool or of adapter.

The package may thus contain the stator of the sealing system and the collet nut, and ranges of seals, seal-bearing rings and of adapter rings or adapter seals adapted to the various diameters of tool.

Yet another subject of the invention is a range of at least a first and a second sealing system, or a set of at least a first sealing system and a range of components that allow this first sealing system to be modified to form a second sealing system by reusing components of the first sealing system, the two sealing systems being intended for one and the same tool holder of a cutting fluid-assisted machine tool, adapted to different diameters D1 and D2 of tool or adapter, and to different diameters D3 and D4 of adapter rings or adapter sleeves mounted on the tools or adapters where D2 is greater than D1, and D4 greater than D3, each sealing system comprising at least a first seal contributing to delimiting a space for the circulation of the fluid toward at least one internal passage of the tool, the seal being interposed between surfaces to which a relative rotational movement is imparted, as the tool rotates, the first seal of the first sealing system being intended to press against the adapter ring or the adapter sleeve of diameter D3, and the first seal of the second sealing system being intended to press against the adapter ring or the adapter sleeve of diameter D4, each sealing system also comprising a second seal likewise contributing to delimiting the space for the circulation of the fluid, the second seal of the first sealing system being intended to collaborate with the tool or adapter of diameter D1, the second seal of the first sealing system being of an inside diameter less than the inside diameter of the second seal of the second sealing system, intended to collaborate with the tool or adapter of diameter D2.

Yet another subject of the invention is a machining method, comprising the steps involving:

selecting a tool from a number of tools of different diameters, depending on the tool chosen, selecting a sealing system according to the invention or the components that allow the sealing system to be modified to adapt it to the diameter of the tool or of an adapter there may be, this sealing system being chosen from at least two sealing systems adapted to tools of different diameters or the components being chosen from ranges of components adapted to different diameters of tool, fitting the tool and the adapted sealing system or the components allowing the sealing system in place to be modified to adapt it to the diameter of the tool or of the adapter there may be, proceeding to machine using the tool and the sealing system thus fitted.

The choice of components may be restricted, aside from the choice of an adapted clamping means such as an expanding collet, to the choice of a seal-bearing ring (with the seals) that is adapted to the diameter of the tool or of the adapter bearing the tool, notably when the two seals each come into contact with the tool or with an adapter to which the tool is fixed, or to the choice of a seal-bearing ring (with the seals) and of an adapter ring or an adapter sleeve, when just one of the seals presses directly against the tool and the other presses against the adapter ring or the adapter sleeve.

The invention may be better understood from reading the following detailed description of some nonlimiting exemplary embodiments thereof and from studying the attached drawing in which.

The tool has been depicted schematically in the figures. The invention is not restricted to one particular tool, and this tool may be something other than a drill bit.

Figure 1:
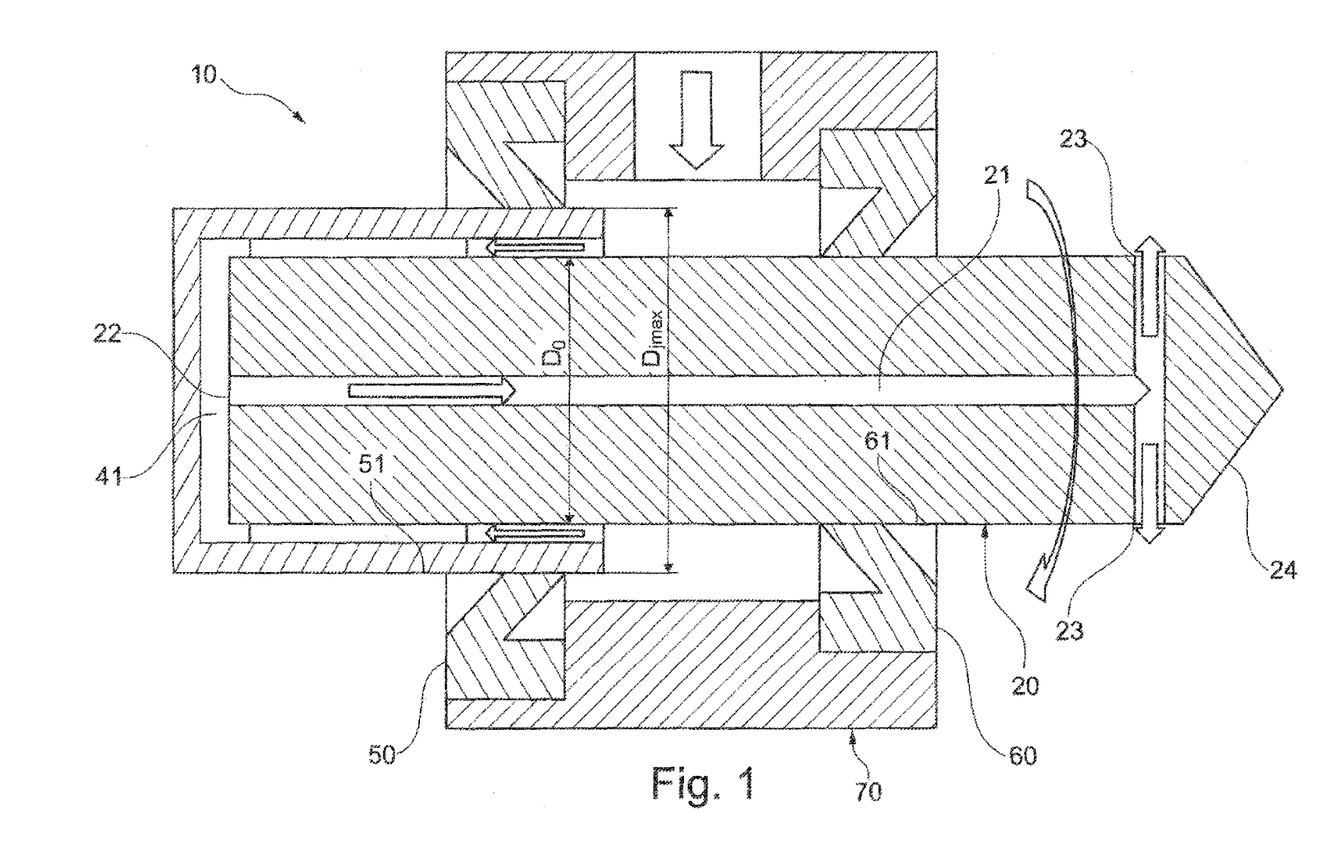
FIG. 1 is a simplified diagram of one variant of the invention, given by way of introduction.

FIG. 1 is a simplified depiction of a tool-holder 10 produced in accordance with the invention, notably in accordance with variant b) defined above, in which one of the seals presses against a surface of the tool holder and the other presses directly against the tool.

The tool holder 10 takes a tool 20, depicted schematically, comprising an internal passage 21 that allows fluid to be conveyed from an inlet 22, situated for example as illustrated at the proximal (shank) end of the tool, toward one or more outlets 23 situated near a cutting edge 24 of the tool. This fluid is typically a lubricant.

The tool is held by the tool holder in such a way as to allow the transmission of torque and circulation of fluid to the inlet 22 and comprises a structure which defines a circulation space 41. The latter is delimited notably by two seals 50 and 60 which press against respective surfaces 51 and 61 formed respectively on the structure and on the tool 20.

The seals 50 and 60 are borne by a stator 70, depicted schematically.

The surface 51 against which the seal 50 presses is of diameter $D_{jmax}$ and that 61 of the tool 20 on which the seal 60 presses is of diameter Do.

In the schematic FIG. 1, any guiding rolling bearing or bearings there may be have not been depicted.

According to the invention, Do and $D_{jmax}$ satisfy the relationship $0.3 \leq Do/Dj_{max}$ for Do in the range [1; 3] in mm and $0.5 \leq Do/Dj_{max}$ for Do in the range [3; 20] in mm, where $Dj_{max}$ is the internal diameter of the larger of the two seals, namely the seal referenced 50.

The rubbing speed is thus reduced and a higher rotational frequency, notably one greater than or equal to 5000 rpm, can be tolerated.

For preference, the tool holder is produced in such a way as to minimize $D_{jmax}$ while at the same time leaving a sufficient passage for the fluid to pass as far as the inlet 22 into the tool 20.

It thus may prove beneficial to reduce the thickness of the wall defining the surface 51 as far as possible, depending on the nature and treatment of the material of which it is made, on the rubbing speed of the seal, on the ability to remove the heat generated by the rubbing of the seal and the mechanical stresses applied to the tool holder.

Figure 2A:
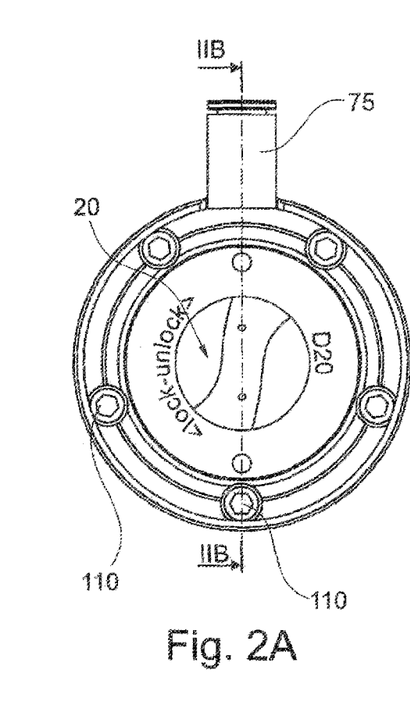
FIGS. 2A, 3A, 4A, 5A, 6A are end-on views of tool holders according to the invention, with adapted tools and sealing systems.
Figure 2B:
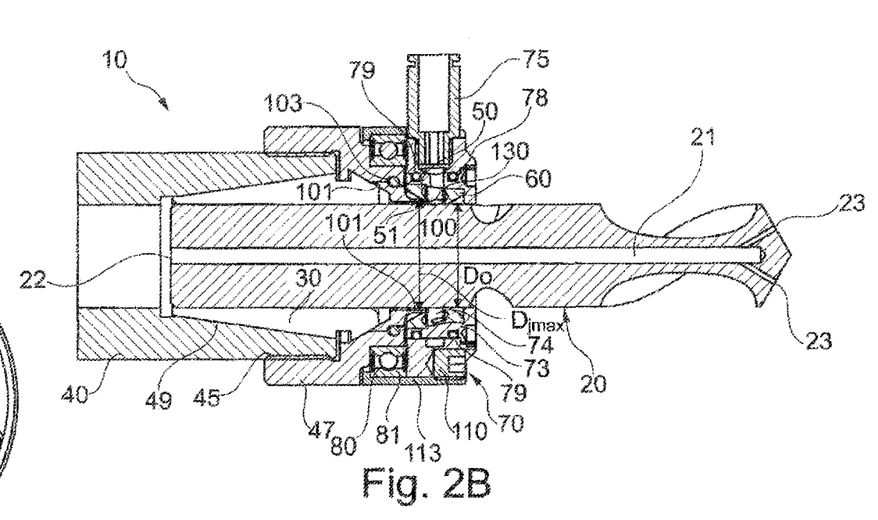
FIGS. 2B, 3B, 4B, 5B, 6B are views in longitudinal section, on IIB-IIB, IIIB-IIIB, IVB-IVB, VB-VB, VIB-VIB of FIGS. 2A, 3A, 4A, 5A, 6A, respectively.
Figure 2C:
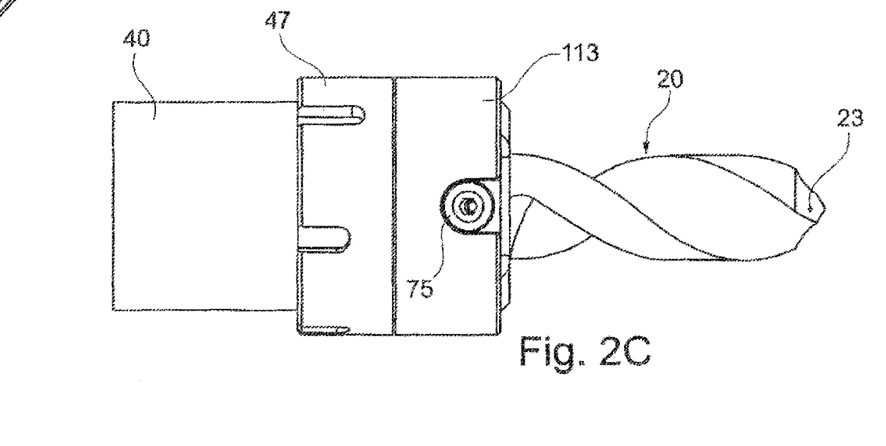
FIGS. 2C, 3C, 4C, 5C, 6C are side views of the tool holders of FIGS. 2A, 3A, 4A, 5A, 6A, respectively.

FIGS. 2A to 2C on the one hand, and 3A to 3C on the other, depict two examples of a tool holder equipped with two sealing systems adapted to different respective tool diameters, according to variant b) of the invention.

The tool holder comprises a body 40 provided with a conical recess 49 collaborating with a collet 30 and a collet nut 47 that tightens the collet 30 is screwed onto a screw thread 45 of the body 40.

The body 40 rotates with the tool 20 guiding a rolling bearing 80 of which one of the rings, referenced 81, the radially outermost one, is fixed with respect to the stator 70.

The tool holder comprises an adapter ring 101 having a thinned wall 100 against which the rubbing surface 51 of the seal 50 presses.

This wall 100 extends a small distance away from the surface of the tool 20, so as to minimize the internal diameter of the seal 50.

The adapter ring 101 is assembled with the collet nut 47 with the interposition of an O-ring seal 103, in order to seal the assembly.

The adapter ring 101 comes into contact with the end of the collet 30, in the example being considered, and this ensures that it is completely immobilized in the tool holder.

The seals 50 and 60 are borne by a seal-bearing ring 73 mounted on a body 78 of the stator 70, the ring 73 defining, with the seals 50 and 60, a chamber 74 into which the fluid from a coupling end fitting 75 is injected via orifices 130.

The seal-bearing ring 73 is held on the body 78 of the stator 70 with the interposition of O-ring seals 79, in order to seal the assembly.

Set screws 110 hold the rolling bearing 80 by collaborating with an outside ring 113 mounted on the body 78 of the stator 70.

Figure 3A:
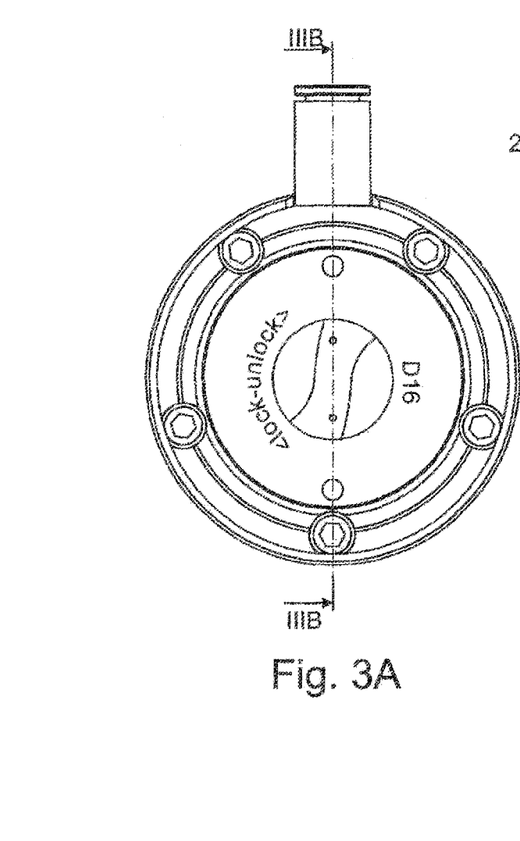
Figure 3B:
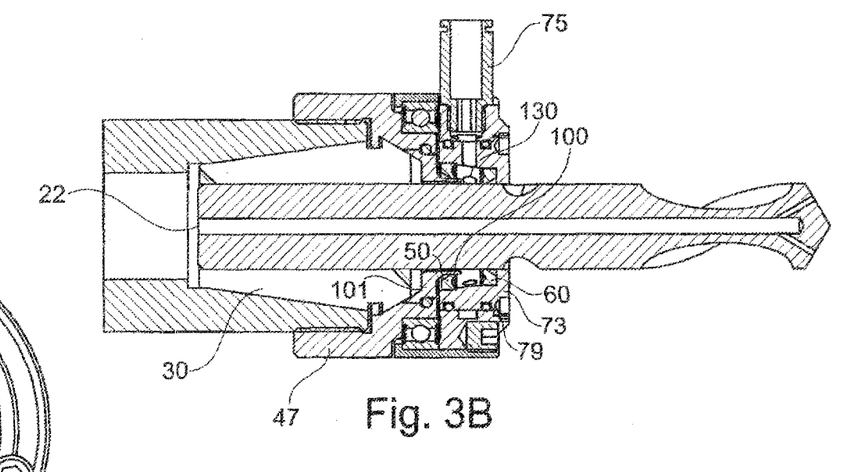
Figure 3C:
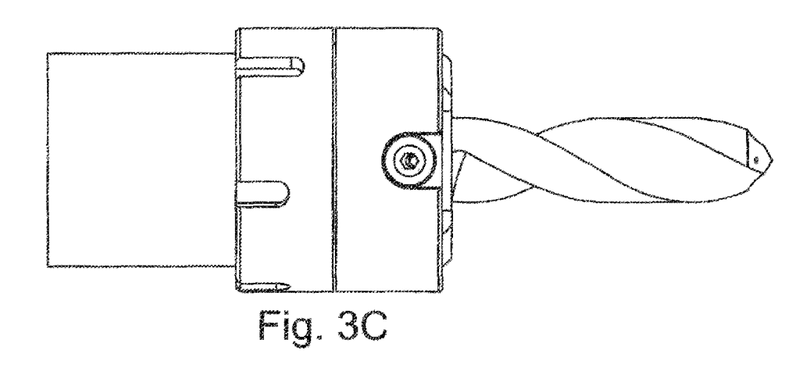

In the example illustrated in FIGS. 3A to 3C, the tool 20 is of a smaller diameter than in the example of FIGS. 2A to 2C, for example 16 mm instead of 20 mm.

The collet 30 is different, being adapted to the new diameter of tool 20.

The body 40 is unchanged, as is the collet nut 47. The adapter ring 101 is replaced by a new ring of smaller inside diameter, so as to compensate for the reduction in the diameter of the tool 20. Replacing the adapter ring 101 means that the smallest possible clearance suited to the circulation of the fluid can be maintained between the thinned wall 100 and the surface of the tool 20.

In the example of FIGS. 3A to 3C, the seal-bearing ring 73 is also replaced by a ring adapted to the seals that it is to hold and has bores of different diameters.

The other components of the tool holder remain unchanged. Thus, the user has available several components adapted to different diameters of tool, such as a range of seal-bearing rings 73 (with their seals) and of adapter rings 101 which are adapted to specific diameters of tool.

Figure 7:
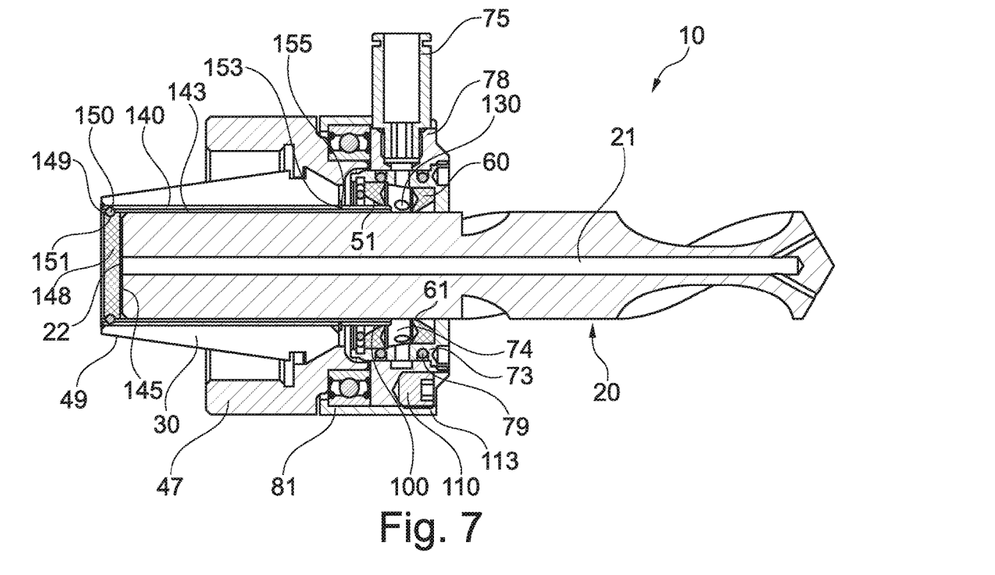
FIGS. 7 and 8 are longitudinal sections of variants of tool-holder according to the invention.
Figure 8:
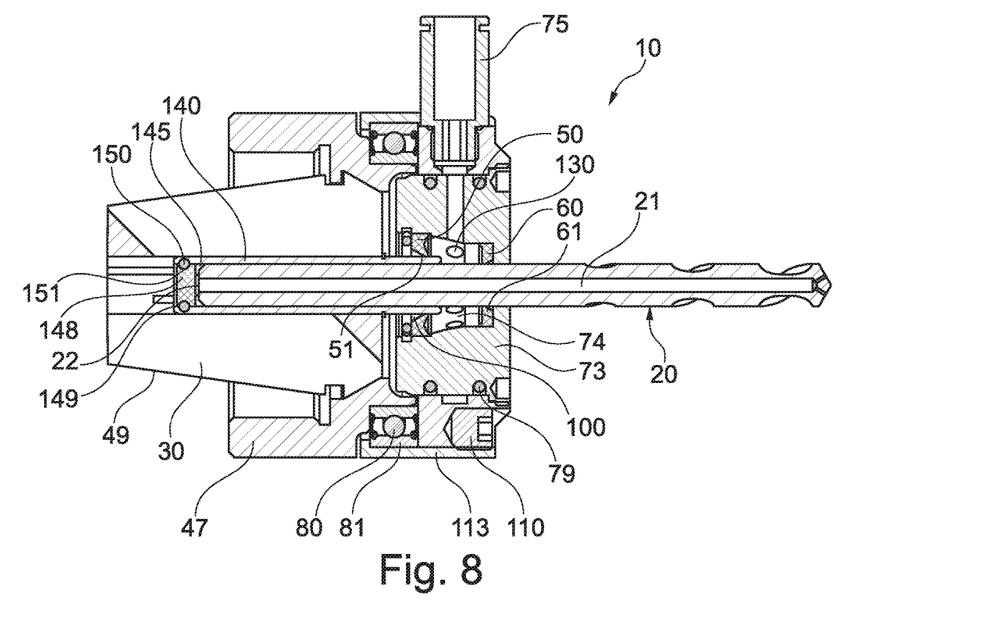

As an alternative, as illustrated in FIGS. 7 and 8, the tool holder comprises an adapter sleeve 140 against which the seal 50 presses. The adapter sleeve 140 fits around the tool 20 and is arranged radially between the collet 30 and the tool 20. The adapter sleeve 140 extends longitudinally between the chamber 74 into which the fluid is injected by the coupling end piece 75 and the internal end of the tool holder. The adapter sleeve 140 is deformable and as the collet 30 is tightened, it can transmit the clamping force to the tool 20 in order to hold the latter in place. As the collet is loosened, the adapter sleeve 140 relaxes and frees the tool 20. The adapter sleeve 140 comprises, as illustrated in FIG. 7, at least one longitudinal groove 143, better a plurality of longitudinal grooves 143, extending over its internal surface over its entire length.

The longitudinal grooves 143 open out, at one end of the adapter sleeve 140, onto the chamber 74 and, at the other end of the adapter sleeve 140, onto a space 145 communicating with the inlet 22 of the internal passage 21 of the tool 20. The longitudinal grooves 143 allow cutting fluid to circulate from the chamber 74 to the internal passage 21 of the tool in order to be fed to this tool.

The internal end of the adapter sleeve 140 comprises a plug 148 adapted to the diameter of the tool 20 and bears an end seal 150. The latter is positioned between the plug 148 and the adapter sleeve 140 and makes it possible to limit the losses of cutting fluid.

For preference, the end seal 150 is positioned in the adapter sleeve 140 in a groove 151 of the adapter sleeve 140. The plug 148 is inserted into the adapter sleeve 140 via the other end thereof so as to slide into the adapter sleeve 140 and become pressed against the end seal 150 in order to ensure sealed closure of the adapter sleeve 140. The plug 148 comprises a groove 151 intended to accept the end seal 150. The latter may clip into the groove 151. The latter has a cross section slightly exceeding a quadrant, notably of between 90° and 120°. Because the groove 151 is open in the opposite direction to the end via which the plug is introduced into the sleeve, a greater space 149 is created behind the seal 150 between the plug 148 and the internal surface of the sleeve 140.

The end seal 150 restrains the plug 148 against the pressure of the cutting fluid in the adapter sleeve, comprised between 1 bar and 10 bar, better between 1 bar and 7 bar.

The adapter sleeve 140 comprises an annular groove 153 which accepts a snap ring (circlip) 155 positioned between the collet 30 and the seal-bearing ring 73. The snap ring 155 is positioned in the annular groove 153 and immobilizes the adapter sleeve 140 at a predetermined depth of penetration.

As illustrated in FIGS. 7 and 8, the adapter sleeve 140, the plug 148, the end seal 150 and the snap ring 155 are adapted to the diameter of the tool 20.

Figure 4A:
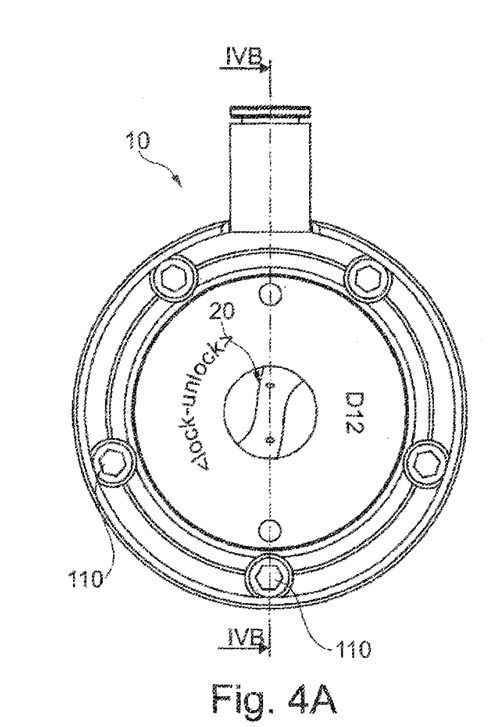
Figure 4B:
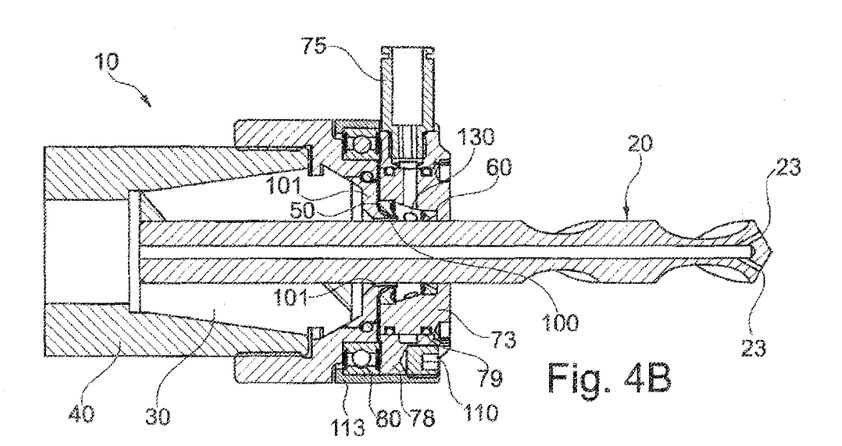
Figure 4C:
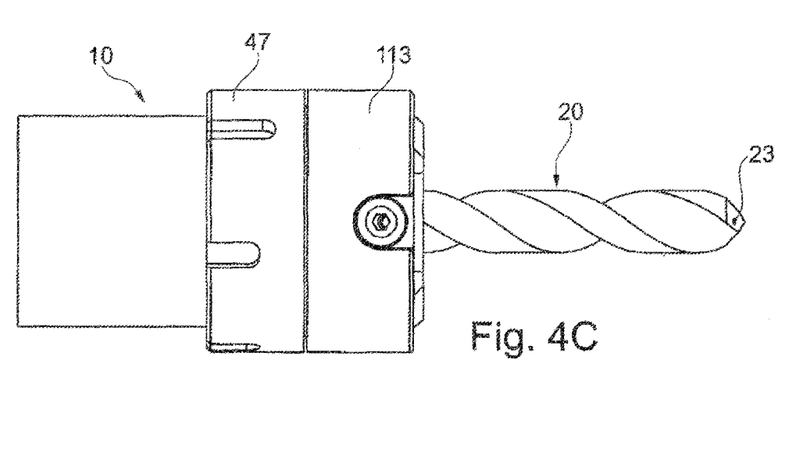

The example of FIGS. 4A to 4C is similar to that of FIGS. 3A to 3C, for another diameter of tool, which is smaller still, for example 12 mm.

Figure 5A:
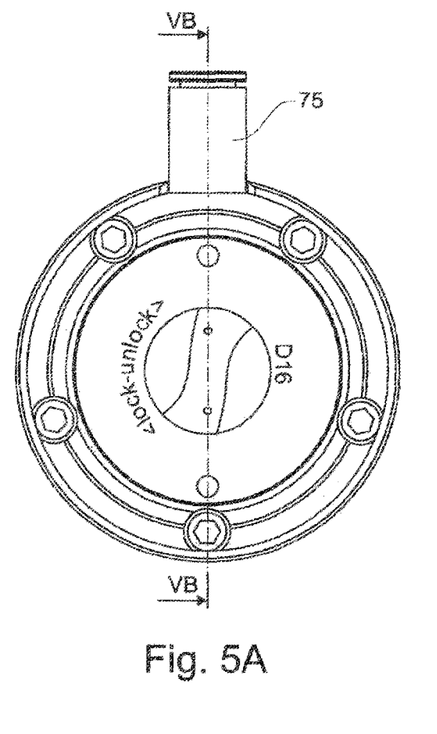
Figure 5B:
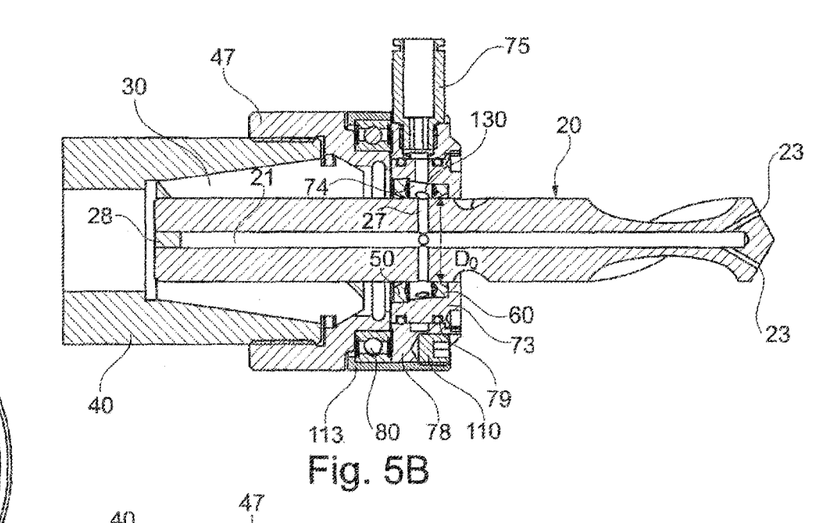
Figure 5C:
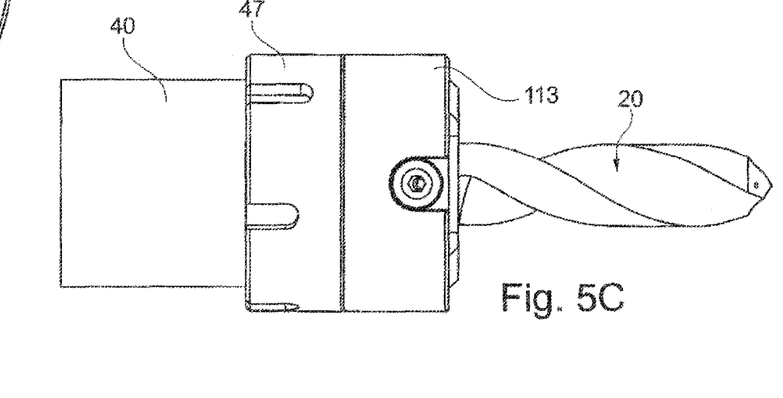

In the example of FIGS. 5A to 5C, the two seals 50 and 60 press directly against the tool 20, making it possible to minimize the rubbing speeds of said seals.

As an alternative, these seals press against an adapter to which the tool is fixed, as described later on.

In the example of FIGS. 5A to 5C, in order to ensure the supply of fluid to the tool 20, the latter is provided with at least one internal passage 27 opening into the fluid circulation space 74, between the seals 50 and 60.

For example, as illustrated, the tool 20 comprises several radial passages 24 communicating with the longitudinal internal passage 21, which is plugged by a plug 28 at its proximal (tool shank) end.

The adapter ring 101 of the examples of FIGS. 3A and 3B is no longer needed because the seals press directly against the tool 20 and because the fluid is no longer inlet via the proximal end thereof.

Figure 6A:
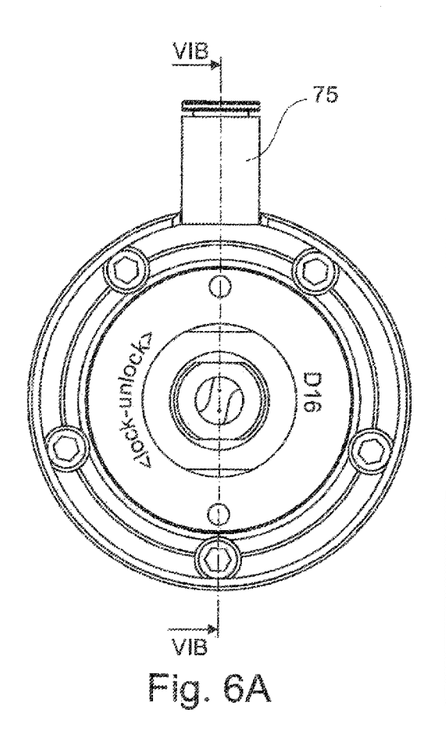
Figure 6B:
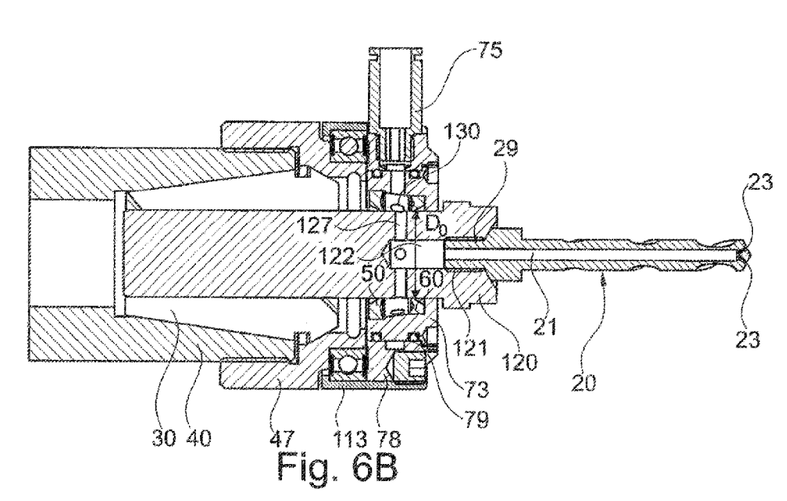
Figure 6C:
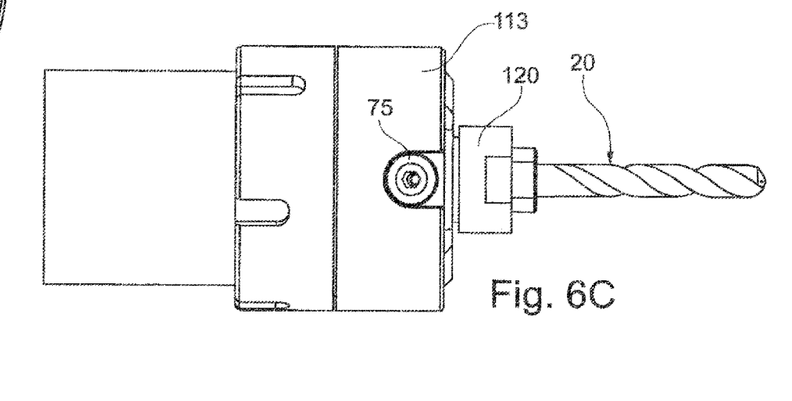

In the variant of FIGS. 6A to 6C, the tool 20 is borne by an adapter 120.

The tool 20 has, for example, as illustrated, a shank 29 screwed into a tapping 121 of the adapter.

The passage 21 of the tool communicates with a chamber 122 into which there open radial passages 127 of the adapter that perform the same function as the passages 27 described previously. The seals 50 and 60 press against the adapter 120.

Of course, the invention is not restricted to the examples illustrated.

It is notably possible to modify the shape of the tool holder and to create other assemblies that allow the rubbing surface of the seals to be better brought closer to the surface of the tool.

Clamping means other than an expanding collet may be used, for example a shrink-fitted band, mechanical binding band, or radial clamping.

The expression "comprising a" is to be understood as being synonymous with "comprising at least a" and "comprised between" includes end points.

The invention claimed is:

1. A sealing system for a tool holder of a fluid-assisted milling or axial machining machine tool, comprising:
   at least a first and a second seal contributing to delimiting a space for the circulation of the fluid toward at least one internal passage of the tool, one of the seals pressing against the tool or a tool-bearing adapter there may be, and the other seal pressing against a surface spaced away from the tool and rotating with the latter, with $0.3 \leq Do/Dj_{max}$ for Do in the range of 1 mm to 3 mm and $0.5 \leq Do/Dj_{max}$ for Do in the range of 3 mm to 20 mm, where Do is the diameter of the tool facing this other seal and $Dj_{max}$ is the internal diameter of this seal.

2. The system as claimed in claim 1, comprising a collet nut for tightening an expanding collet that holds the tool or the adapter, fixed to a body of the tool holder.

3. The system as claimed in claim 1, the surface being defined by an adapter ring.

4. The system as claimed in claim 1, the seals being borne by a ring adapted to the diameter of the tool or of the adapter, arranged in contact with a stator body.

5. The system as claimed in claim 1, the surface being defined by a deformable, adapter sleeve.

6. The system as claimed in claim 5, the adapter sleeve comprising at least one longitudinal groove extending over its internal surface and over the entire length.

7. The system as claimed in claim 5, comprising an O-ring seal positioned between a plug and the adapter sleeve, the plug being held against the seal by the pressure of the cutting fluid present in the adapter sleeve.

8. The system as claimed in claim 1, the axial or milling machining operation being a machining operation of drilling or of countersinking.

9. A range of at least a first and a second sealing system as claimed in claim 1, the two sealing systems being intended for one and the same tool holder of a cutting fluid-assisted machine tool, adapted to different diameters D1 and D2 of tool or adapter, where D2 is greater than D1, each sealing system comprising at least a first seal contributing to delimiting a space for the circulation of the fluid toward at least one internal passage of the tool, the seal being interposed between surfaces to which a relative rotational movement is imparted, as the tool rotates, the inside diameter of the first seal of the first sealing system being intended to collaborate with the tool or adapter of diameter D1, and the inside diameter of the first seal of the second sealing system being intended to collaborate with the tool or adapter of diameter D2,
   each sealing system also comprising a second seal likewise contributing to delimiting the space for the circulation of the fluid, the second seal of the first sealing system being intended to collaborate with the tool or adapter of diameter D1, the second seal of the first sealing system being of an inside diameter less than the inside diameter of the second seal of the second sealing system, intended to collaborate with the tool or adapter of diameter D2.

10. A range of at least a first and a second sealing system as claimed in claim 5, the two sealing systems being intended for one and the same tool holder of a cutting fluid-assisted machine tool, adapted to different diameters D1 and D2 of tool or adapter, and to different diameters D3 and D4 of adapter rings or adapter sleeves mounted on the tools or adapters, where D2 is greater than D1, and D4 greater than D3 each sealing system comprising at least a first seal contributing to delimiting a space for the circulation of the fluid toward at least one internal passage of the tool, the seal being interposed between surfaces to which a relative rotational movement is imparted, as the tool rotates, the first seal of the first sealing system being intended to press against the adapter ring or the adapter sleeve of diameter D3, and the first seal of the second sealing system being intended to press against the adapter ring or the adapter sleeve of diameter D4,     each sealing system also comprising a second seal likewise contributing to delimiting the space for the circulation of the fluid, the second seal of the first sealing system being intended to collaborate with the tool or adapter of diameter D1, the second seal of the first sealing system being of an inside diameter less than the inside diameter of the second seal of the second sealing system, intended to collaborate with the tool or adapter of diameter D2.

11. A machining method, comprising:

selecting a tool from a number of tools of different diameters, depending on the tool chosen, selecting a sealing system as claimed in of claim 1 or components that allow the sealing system to be modified to adapt it to the diameter of the tool or of an adapter there may be, this sealing system being chosen from at least two sealing systems adapted to tools of different diameters or the components being chosen from ranges of components adapted to different diameters of tool, fitting the tool and the adapted sealing system or the components allowing the sealing system in place to be modified to adapt it to the diameter of the tool or of the adapter there may be, proceeding to machine using the tool and the sealing system thus fitted.

12. The method as claimed in claim 11, the choice of components being restricted, aside from the choice of an adapted clamping means such as an expanding collet, to the choice of a seal-bearing ring, with the seals, that is adapted to the diameter of the tool or of the adapter bearing the tool, or to the choice of a seal-bearing ring, with the seals, and of an adapter ring, when just one of the seals presses directly against the tool and the other presses against the adapter ring.

13. The method as claimed in claim 11, the choice of components comprising that of an adapter sleeve adapted to the diameter of the tool against which the first seal presses.

* * * * *